(12) United States Patent
Freakes (10) Patent No.: US 9,186,682 B2
(45) Date of Patent: Nov. 17, 2015

(54) MULCHING APPARATUS

(71) Applicant: Anthony Freakes, Skillman, NJ (US)

(72) Inventor: Anthony Freakes, Skillman, NJ (US)

( * ) Notice: Subject to any disclaimer, the term of this patent is extended or adjusted under 35 U.S.C. 154(b) by 201 days.

(21) Appl. No.: 13/714,895

(22) Filed: Dec. 14, 2012

(65) Prior Publication Data

US 2013/0175376 A1   Jul. 11, 2013

Related U.S. Application Data

(60) Provisional application No. 61/570,648, filed on Dec. 14, 2011.

(51) Int. Cl.
*B02C 23/24* (2006.01)
*B02C 23/02* (2006.01)
*A01G 3/00* (2006.01)

(52) U.S. Cl.
CPC .............. *B02C 23/02* (2013.01); *A01G 3/002* (2013.01); *B02C 23/24* (2013.01); *B02C 2201/066* (2013.01)

(58) Field of Classification Search
CPC ........ B01D 45/12; B02C 1/00; B02C 13/286; B02C 4/42; B02C 18/142; B02C 18/2291; B02C 13/00; B02C 18/362; B02C 2201/066; B02C 23/02; B02C 23/24; A01G 3/00
USPC ............. 241/60, 101.2, 186.2, 222, 224, 248, 241/285.1, 287, 292.1; 144/172, 180, 144/252.1, 252.2
See application file for complete search history.

(56) References Cited

U.S. PATENT DOCUMENTS

| | | | | |
|---|---|---|---|---|
| 4,773,601 A | * | 9/1988 | Urich et al. | 241/101.761 |
| 4,875,630 A | * | 10/1989 | Carlson | 241/56 |
| 5,020,309 A | * | 6/1991 | Hopkins | 56/13.3 |
| 5,102,056 A | * | 4/1992 | Ober | 241/55 |
| 5,137,219 A | * | 8/1992 | Morey | 241/92 |
| 5,762,273 A | * | 6/1998 | Shubin | 241/60 |
| 5,860,606 A | * | 1/1999 | Tiedeman et al. | 241/55 |
| 2007/0289657 A1 | * | 12/2007 | Gunson | 141/5 |

* cited by examiner

*Primary Examiner* — Faye Francis
*Assistant Examiner* — Onekki Jolly
(74) *Attorney, Agent, or Firm* — Timothy X. Gibson, Esq.; Gibson & Dernier LLP (57) ABSTRACT

A system is disclosed for mulching material including a floor stand configured to secure a hand-manipulatable blower/vacuum mulching device in a position to receive material to be mulched, and a hopper having an end for receiving material to be mulched and an opposite end configured to be connected to an intake of the mulching device. A floor stand is disclosed which is operable to secure a hand-manipulatable blower/vacuum mulching device in an upright position. A floor stand may include a securing device pivotably engaged thereto, wherein the securing device is operable to removably engage and permit pivotable selective positioning of a hand-manipulatable blower/vacuum mulching device.

11 Claims, 8 Drawing Sheets

MULCHING APPARATUS

CROSS-REFERENCE TO RELATED APPLICATIONS

This application claims the benefit of U.S. Provisional Patent Application Ser. No. 61/570,648, filed Dec. 14, 2011, the entirety of which is incorporated by reference herein.

FIELD OF THE INVENTION

The invention relates to the field of mulching devices. More specifically, it relates to a low-cost, environmentally friendly mulcher.

BACKGROUND OF THE INVENTION

Hand-manipulated electric blowers with vacuum/mulching features and attachments are convenient for most homeowners. The debris in flower beds and in other areas can be sucked up, mulched and distributed in soil and beds as desired, quickly and conveniently. However, some gardeners are reluctant to use such low cost, hand-manipulated electric blowers with vacuum/mulching features, because in vacuuming/mulching mode, such devices suck up beneficial organisms and creatures which dwell in the soil. Such an outcome is undesirable for these individuals. Moreover, vibrations from hand-manipulated blowers and vacuums can cause hand numbness. In addition, a user is required to carry the mulch bag around with them. One solution is for gardeners to use a stand-alone mulching device. Typical stand-alone mulching machines employ a top-loading hopper so that mulchable debris can be carefully loaded into the device. However, these devices tend to be large and expensive, and inconvenient to move around, compared to the aforementioned hand-manipulated blowers with vacuum/mulching capability, which typically include accessories such as vacuum ducts and collection bags, and are generally available for about $70.

SUMMARY OF THE INVENTION

In accordance with one embodiment a system is disclosed for mulching material including a floor stand configured to secure a hand-manipulatable blower/vacuum mulching device in a position to receive material to be mulched, and a hopper having an end for receiving material to be mulched and an opposite end configured to be connected to an intake of the mulching device. The end for receiving material to be mulched may be a funnel. The floor stand may be configured to secure a hand-manipulatable blower/vacuum mulching device in a position wherein the intake of the mulching device is oriented in a direction substantially perpendicular to and facing away from the ground. The floor stand may include a securing device for releasably securing a hand-manipulatable blower/vacuum mulching device. An example of a hand-manipulatable blower/vacuum mulching device to be secured is one commercially available from the Toro company as the "Ultra Electric Blower Vac", model number 51599.

In accordance with one embodiment the system may include a hopper having at least one side which is substantially flat. In another embodiment the hopper may have at least one side which is substantially flat and have a leading edge which extends beyond a leading edge of an opposite side. The end of the hopper for receiving material to be mulched include an opening that is wider than an opening formed in the opposite end configured to be connected to an intake of the mulching device.

In accordance with another embodiment, the system may include a floor stand which includes a securing device pivotably engaged thereto, wherein the securing device is operable to removably engage and permit pivotable selective positioning of a hand-manipulatable blower/vacuum mulching device. In another embodiment, the system may include a receptacle support to support a bag or other receptacle which catches mulch from the mulching device. The support is useful in an embodiment in which the floor stand includes a pivotable securing device.

In another embodiment the system may include a floor stand which includes one or more switches electrically connected to an electrical power source or cable operable to turn on and turn off a hand-manipulatable blower/vacuum mulching device. The floor stand may include an electrical receptacle for receiving a power cable of a hand-manipulatable blower/vacuum mulching device, wherein the receptacle is electrically connected to a power cable for connecting to an electrical supply.

In accordance with another embodiment a hopper is provided which is configured to connect to a hand-manipulatable blower/vacuum mulching device, the hopper including an end for receiving material to be mulched and an opposite end configured to be connected to an intake of the mulching device wherein the end for receiving material to be mulched includes an opening that is wider than an opening formed in the opposite end configured to be connected to an intake of the mulching device. The end of the hopper for receiving material to be mulched may include a funnel.

In accordance with a further embodiment the hopper element is configured as an intake chute, permitting the blower/vacuum mulcher to be laid on the ground so that leaves may be swept or raked to the chute and fed into the mulcher. The hopper may include a side which is substantially flat. The hopper may include a side which is substantially flat and a leading edge which extends beyond a leading edge of an opposite side.

In accordance with another embodiment a floor stand is provided which is configured to secure a hand-manipulatable blower/vacuum mulching device in a position to receive material to be mulched. The floor stand may be configured to secure a mulching device in a position wherein the intake of the mulching device is oriented in a direction substantially perpendicular to and facing away from the ground, i.e., in an upright position. The floor stand may include at least one securing device for releasably securing a hand-manipulatable blower/vacuum mulching device.

In accordance with a further embodiment, a floor stand is provided in which the hand-manipulatable blower/vacuum mulching device is pivotably mountable, so that the hopper element may be moved from an upright position to a ground position efficiently and safely. The floor stand may include a securing device pivotably engaged thereto, wherein the securing device is operable to removably engage and permit pivotable selective positioning of a hand-manipulatable blower/vacuum mulching device.

In another embodiment the floor stand may include at least one switch electrically connected to an electrical power source or cable operable to turn on and turn off a hand-manipulatable blower/vacuum mulching device. In a further embodiment the floor stand may include an electrical receptacle for receiving a power cable of a hand-manipulatable blower/vacuum mulching device, wherein the receptacle is electrically connected to a power cable for connecting to an electrical supply.

In accordance with one aspect, a gardener can use the apparatus in the blowing mode for general clean up and leaf collection, and use the same machine to accomplish the mulching in an environmentally sensitive manner, i.e., as a top-loading mulcher, rather than as a hand vacuum.

The disclosed apparatus are cost effective and portable, and more convenient and less costly than commercially available top-loading mulchers.

Given above is a simplified summary in order to provide a basic understanding of some aspects described herein. This summary is not an extensive overview, and is not intended to identify key/critical elements or to delineate the scope of the claimed subject matter.

BRIEF DESCRIPTION OF THE DRAWINGS

So that those having ordinary skill in the art will have a better understanding of how to make and use the disclosed systems and methods, reference is made to the accompanying figure wherein.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
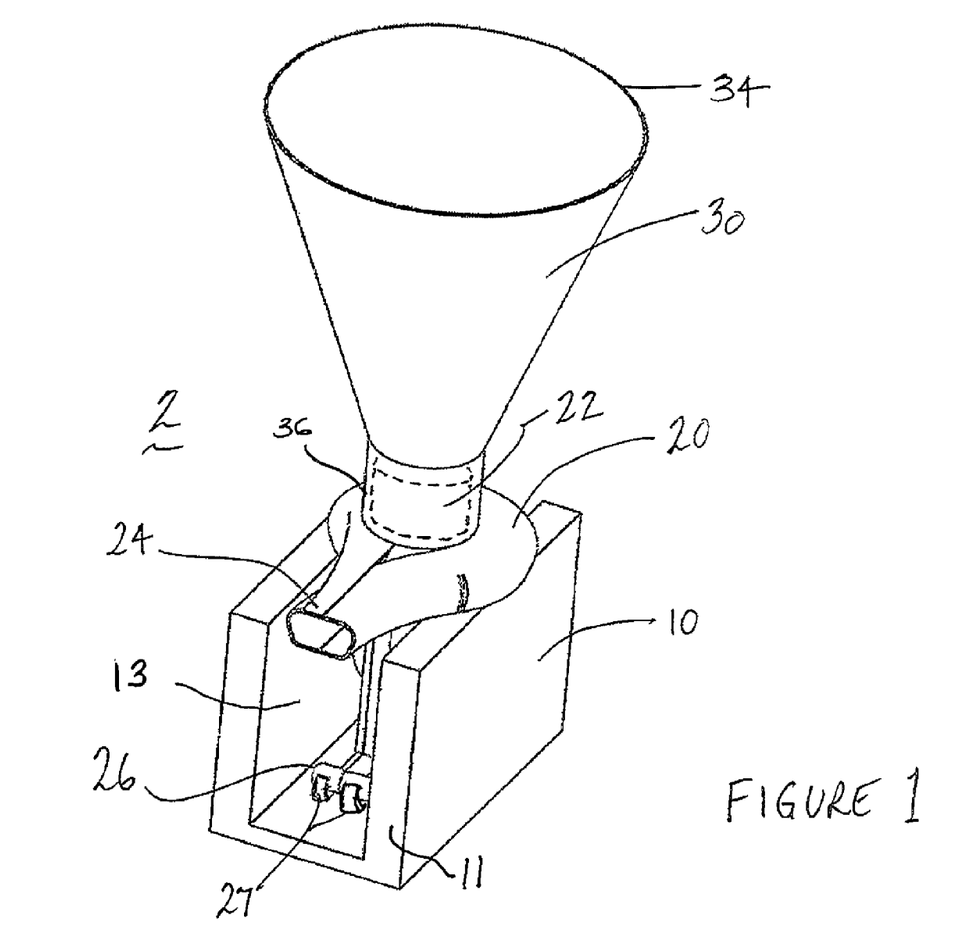
FIG. 1 is a perspective view of a mulching apparatus and floor stand according to one embodiment of the disclosed subject matter.

Now referring to FIG. 1, a mulching apparatus 2 includes a floor stand 10, mulching/blower device 20 and hopper 30.

The floor stand element 10 is operable and dimensioned to receive the mulcher/blower device 20 such that the device 20 is stably and securely positioned in a position as shown in FIG. 1. The floor stand 10 may include a housing 11 including a channel 13 for receiving the mulching/blower device and one or more securing devices such as clamps, clips, braces etc. for securing the mulching/blower device 20. For example, one or more spring clamps or clips 27 may be situated in the floor stand 10 to securably and releasably engage the handle 26 of the mulching/blower device.

The mulching/blower device 20 may be an existing device such as one commercially available from the Toro company as the "Ultra Electric Blower Vac", model number 51599, situated in floor stand 10 as shown. The mulching/blower device 20 includes an inlet 22, outlet 24 and handle 26. The mulching/blower device 20 typically may include a normal variable speed switch, which, prior to installation of the mulching/blower device 20 in the floor stand, may be set to the speed desired. The mulching/blower device 20 also typically may include an on/off switch which may be used while the mulching/blower device 20 is in the stand 10. The mulching/blower device 20 also typically may include a safety switch, which senses if the inlet guard (not shown), or the inlet chute (see FIG. 2) is properly in place. This protects operators from the spinning blades of the impeller (not shown).

Hopper 30 may be configured as a funnel connectable to mulching/blower device 20. Hopper 30 includes a receiving end 34 for receiving leaves and material to be mulched and mulcher attachment end 36.

Figure 2:
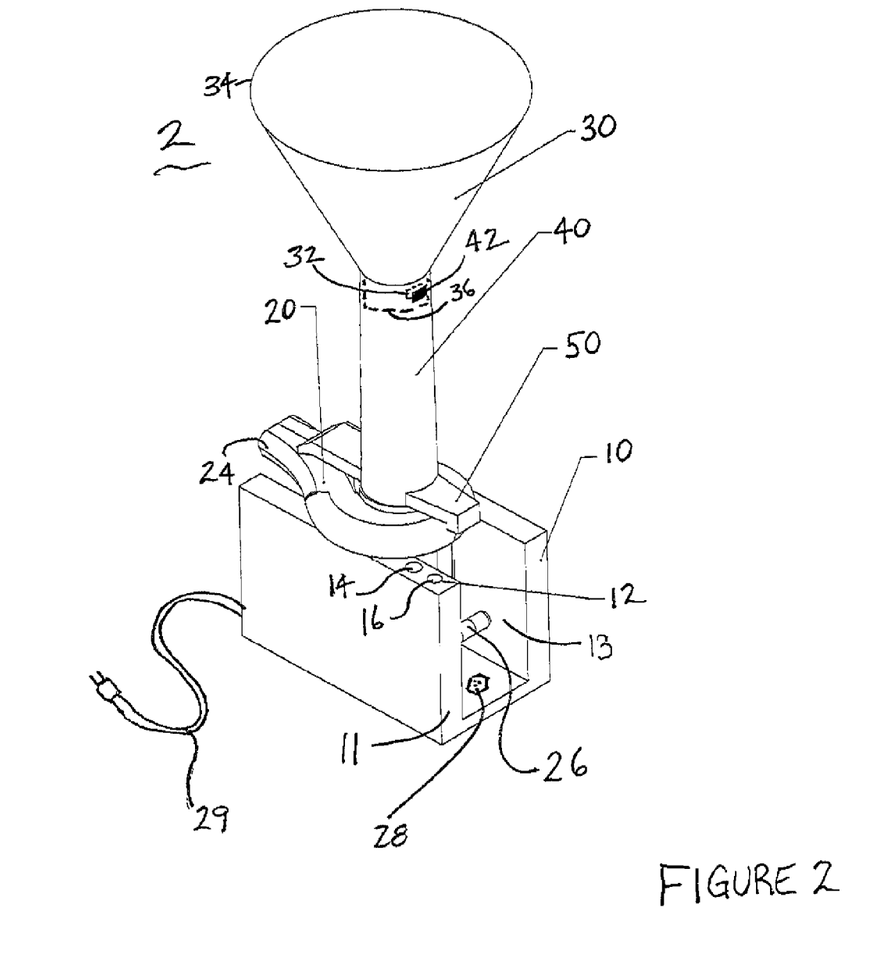
FIG. 2 is a perspective view of a mulching apparatus and floor stand in accordance with one embodiment of the disclosed subject matter.

Now referring to FIG. 2, the floor stand 10 may include a control station 12 with one or more switches, 14, 16 electrically connected to an electrical power source or cable operable to turn on and turn off the mulching/blower device 20 when set up as a mulching apparatus 2. The floor stand 10 may further include an emergency stop switch electrically connected to an electrical power source or cable. The floor stand may include an electrical receptacle 28 for receiving the power cable of the mulching/blower device 20 electrically connected to a power cable 29 for plugging into an electrical supply.

An inlet chute 40 may be employed to connect the hopper 30 to the mulching/blower device 20. In one embodiment the chute 40 is an existing chute that is an accessory of the mulching/blower device 20. The apparatus 2 may further include a safety lock device 50, which may be an existing safety lock device that is an accessory of the mulching/blower device 20. In one example, the chute 40 and safety lock device 50 are accessories of the same mulching/blower device 20, such as the "Ultra Electric Blower Vac", model number 51599 available from Toro. It will be apparent to those skilled in the art that the length of the chute 40 may be any suitable length. Chute 40 may include connector 42 which is complementary to connector 32 of hopper 30 as further exemplified in FIGS. 4 and 5.

Figure 3:
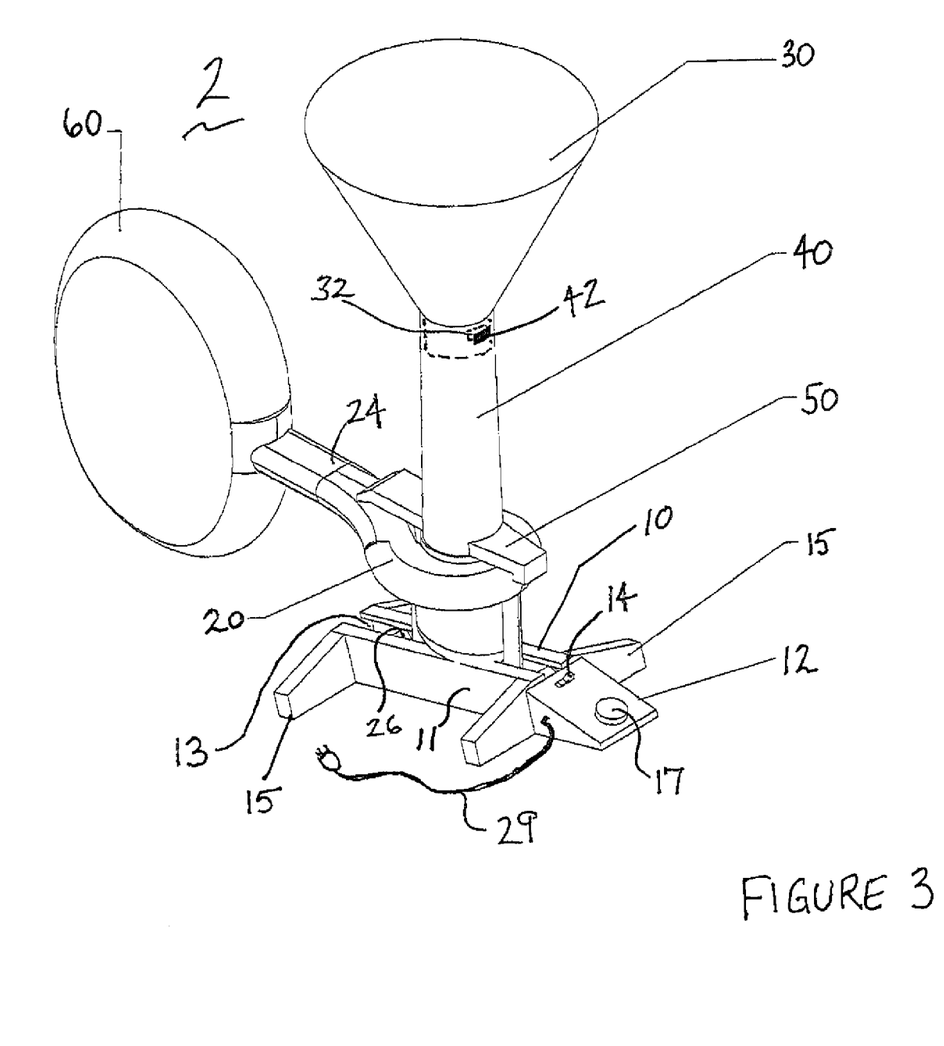
FIG. 3 is a perspective view of a mulching apparatus and floor stand in accordance with one embodiment of the disclosed subject matter.

Now referring to FIG. 3, floor stand 10 may include a housing 11, channel 13 in which the mulching/blower device 20 may be engaged and feet 15. The handle 26 may be slidably and securely engaged in channel 13. Floor stand 10 may include on/off switch 14 and variable speed control operably linked to the corresponding controls of the mulching/blower device 20.

Apparatus 2 may further include a collection container 60 connectable to outlet 24. The collection container 60 may be an existing collection device that is an accessory of the mulching/blower device 20, such as the bag of the "Ultra Electric Blower Vac", model number 51599 available from Toro. The collection device 60 may be a flexible or rigid material and made of any suitable material.

Figure 4:
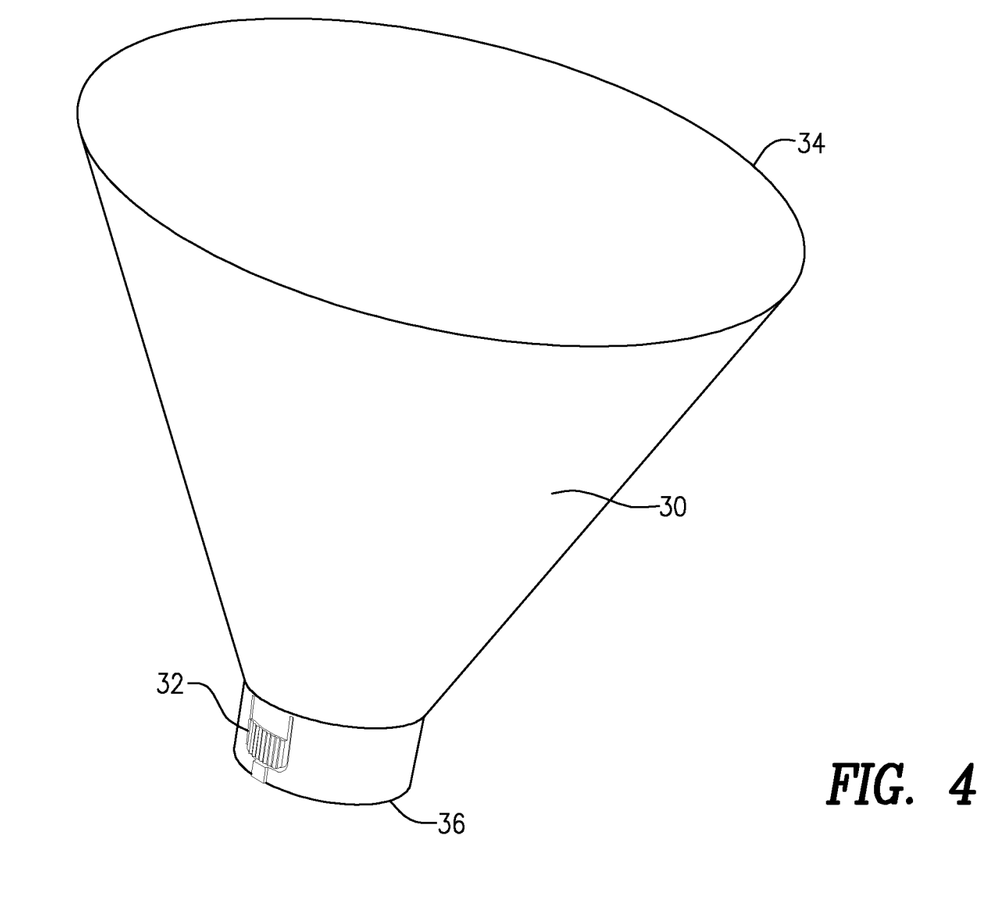
FIG. 4 is a perspective view of a hopper device in accordance with one aspect of the disclosed subject matter.
Figure 5:
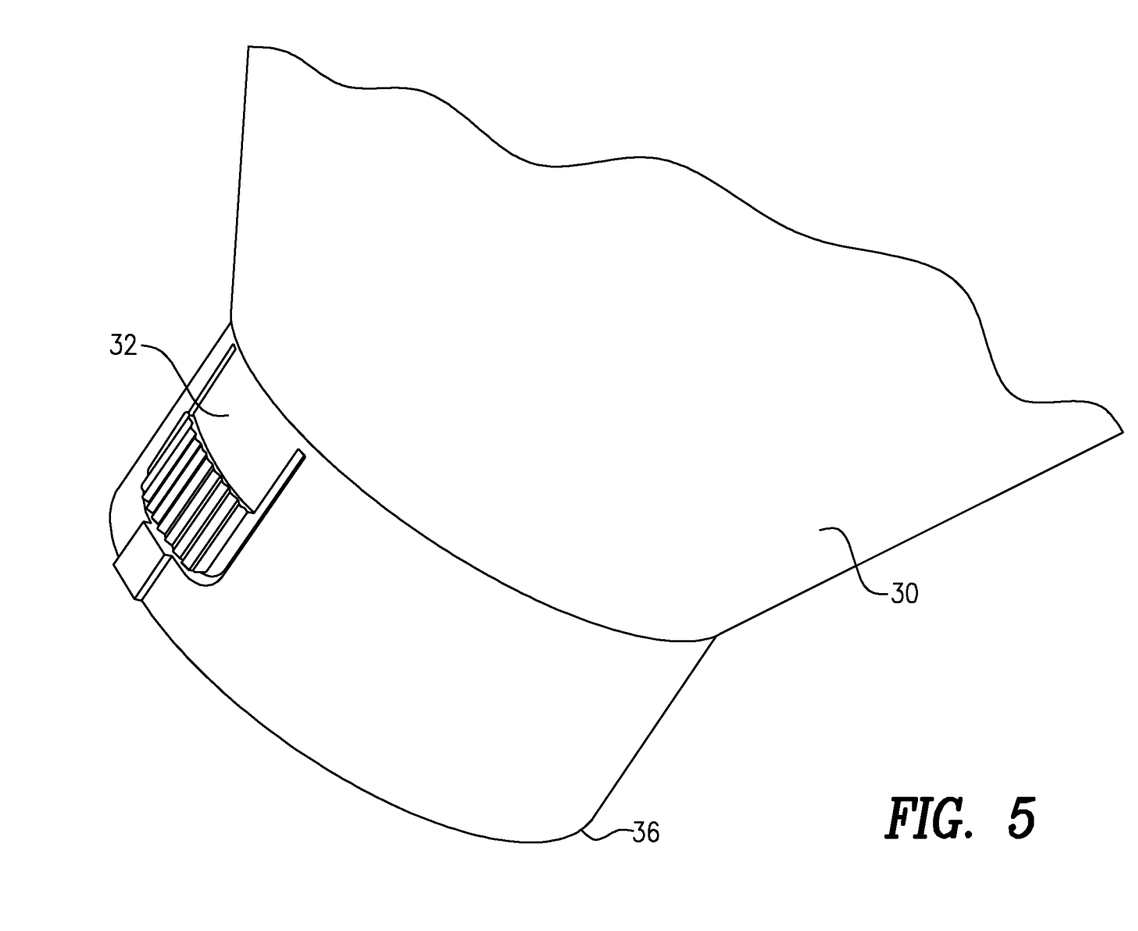
FIG. 5 is a perspective view of a connection element of a hopper device of FIG. 4 in accordance with one aspect of the disclosed subject matter.

Now referring to FIGS. 4 and 5, hopper 30 may include connector 32 which is complementary to a connector 42 of a chute 40 or similar connector on the mulching/blower device 20.

In practice, an operator of the apparatus 2 sets up the mulching/blower device 20 in the floor stand 10, attaches the hopper 30 to the mulching/blower device 20, turns on the power and deposits material to be mulched into the hopper. Mulch is ejected from the outlet 24 and may be captured in receptacle 60.

Figure 6:
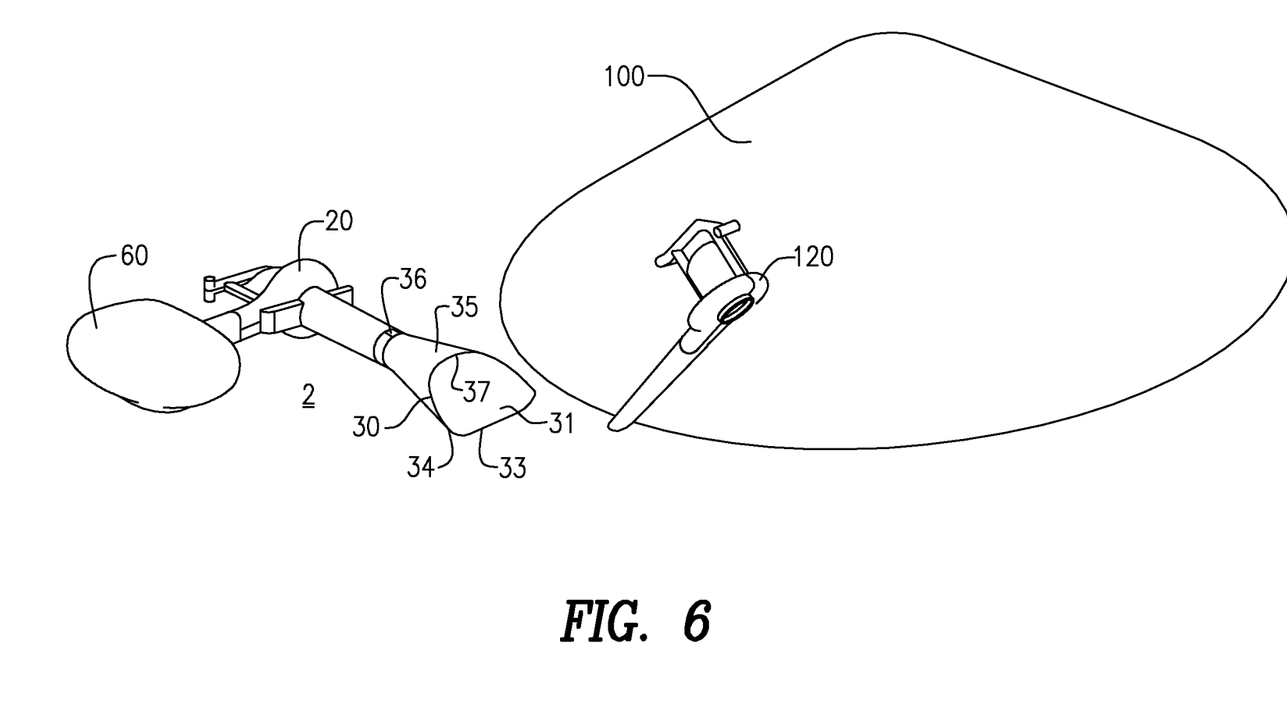
FIG. 6 is a perspective view of a mulching/blower device with another embodiment of a hopper element depicting an application in accordance with one embodiment of the disclosed subject matter.
Figure 7:
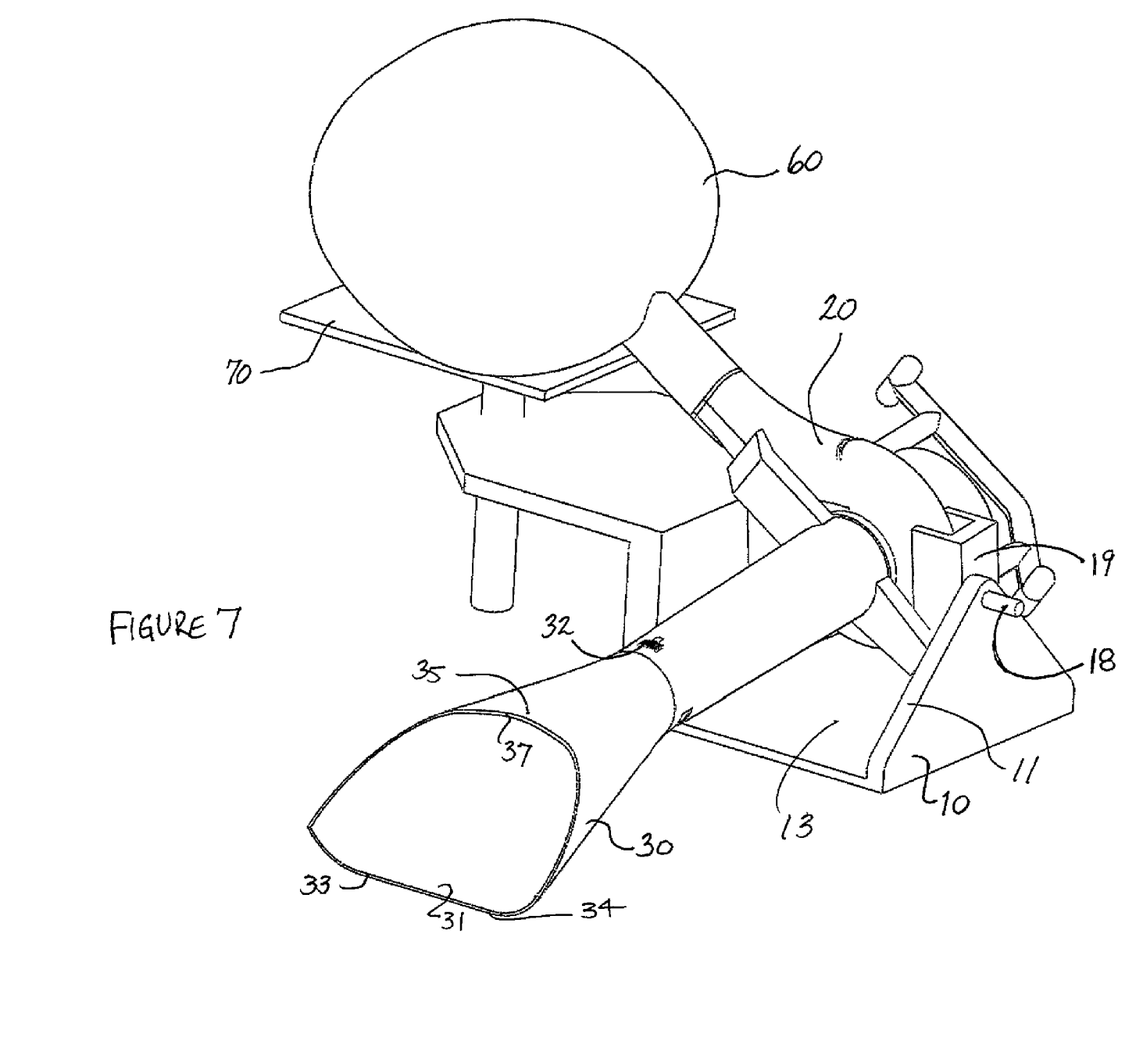
FIG. 7 is a perspective view of a mulching apparatus and pivoting floor stand in accordance with one embodiment of the disclosed subject matter.
Figure 8:
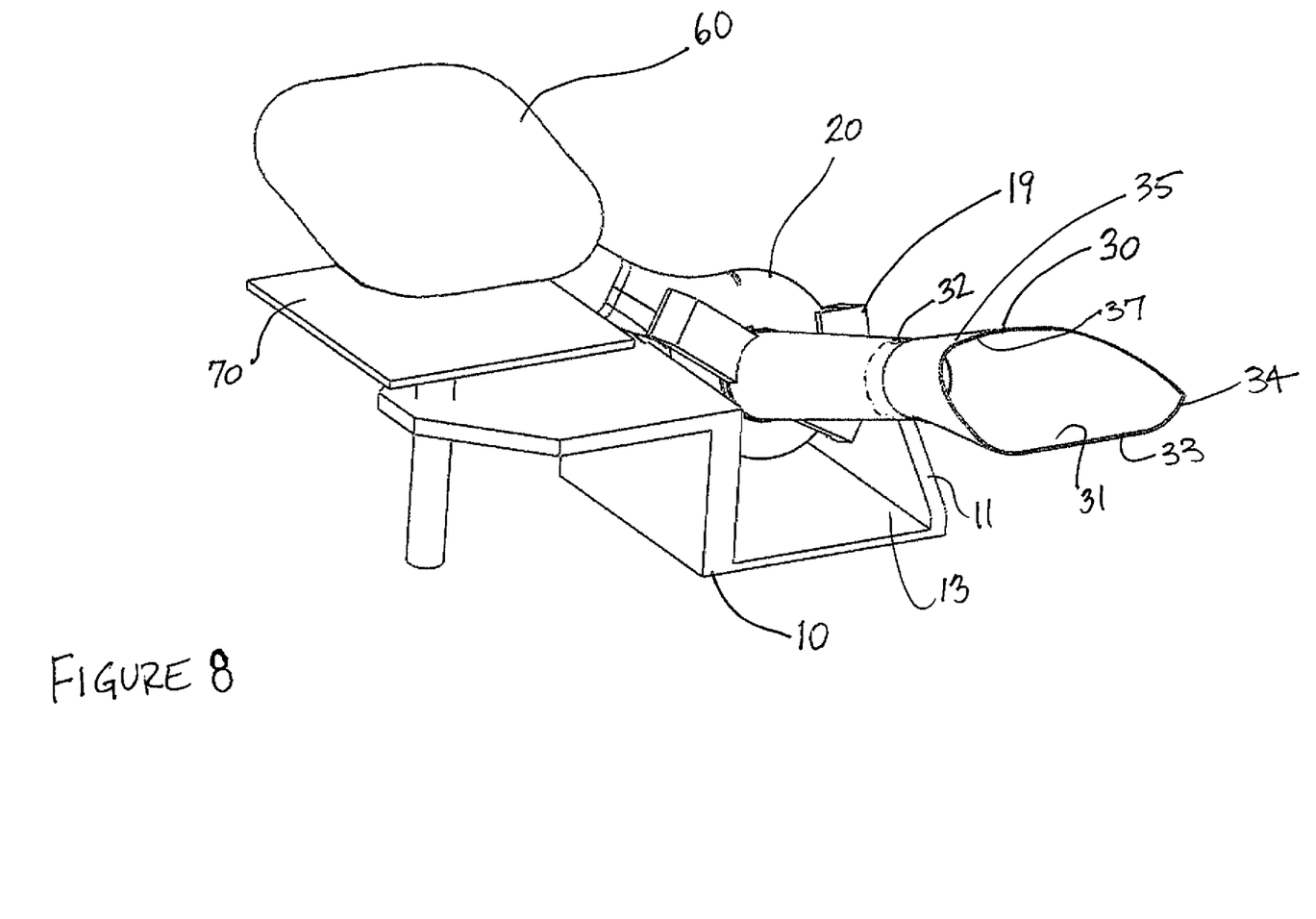
FIG. 8 is a perspective view of a mulching apparatus and pivoting floor stand in accordance with one embodiment of the disclosed subject matter.

Now referring to FIGS. 6-8, another embodiment of the hopper element 30 is depicted. The hopper element 30 is configured as an intake chute, permitting the blower/vacuum mulcher 20 to be laid on the ground so that leaves may be swept or raked to the chute-like hopper 30 and fed into the mulcher 20. In this embodiment no floor stand is required. Preferably, hopper 30 includes a substantially flat, ground-facing side 31 having a leading edge 33 which extends beyond a leading edge 37 of a side 35 opposite the ground-facing side 31. Hopper 30 may have a receiving end 34 having an opening formed therein which is wider than the opening formed in mulcher attachment end 36. In practice, an operator attaches the hopper 30 to the mulching/blower device 20 and lays the apparatus 2 on the ground, for example, adjacent a leaf pile 100, turns on the power and rakes or blows (suing for example blower 120) material to be mulched into the hopper 30. Mulch is ejected from the outlet 24 and may be captured in receptacle 60.

Now referring to FIG. 7, floor stand 10 may further include a pivoting securing device such as a clamp, clip, brace etc. for securing the mulching/blower device 20 so that it may be selectively positioned. For example, clamp 19 may be positioned in channel 13 and rotatably connected to housing 11 such as by pin 18. Clamp 19 may be adjustable in the manner of a vise to securely and releasably engage the body of mulcher 20. Pin 18 may be equipped with a tensioning knob or set screw to secure clamp 19 in a desired position, such as the "down", "up", vertical or another intermediate position. Alternatively, an adjustment device such as a ratchet and pawl device, pin and hole adjustment device or the like may be employed to permit selective positioning of the clamp 19. For example, FIG. 7 depicts the clamp 19 positioned to orient the hopper 30 in a "down" position. Now referring to FIG. 8, the clamp 19 is positioned to orient the hopper 30 in an "up" position. In one embodiment the clamp 19 is rotatable to permit the hopper 30 to be placed in an upright position, perpendicular to the ground.

To facilitate the efficient capture of mulched material, a receptacle support 70 may be provided to support receptacle 60. Receptacle support 70 may be integral with floor stand 10 as shown.

U.S. Pat. Nos. 7,735,188; 5,535,479; RE 36,627; 5,689,852 and 6,003,199 are incorporated by reference herein in their entireties.

Although the apparatus and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A system for mulching material comprising a floor stand comprising a base and sides extending therefrom forming a channel configured to removably secure a hand-manipulatable blower/vacuum mulching device in a position to receive material to be mulched, and a hopper comprising an end for receiving material to be mulched and an opposite end configured to be connected to an inlet of the hand-manipulatable blower/vacuum mulching device, wherein the hand-manipulatable blower/vacuum mulching device comprises a housing, an inlet in the housing configured to receive material to be mulched and to be connected to the opposite end of the hopper, an outlet on the housing configured to expel mulched material, and a handle extending from the housing configured to permit a user to hold and manipulate the hand-manipulatable blower/vacuum mulching device, wherein the channel of the floor stand is configured to removably receive and secure at least the handle of the hand-manipulatable blower/vacuum mulching device.

2. The system according to claim 1 wherein the end for receiving material to be mulched comprises a funnel.

3. The system according to claim 1 wherein the floor stand is configured to secure a hand-manipulatable blower/vacuum mulching device in a position wherein the intake of the mulching device is oriented in a direction substantially perpendicular to and facing away from the ground.

4. The system according to claim 1 wherein the hopper comprises at least one side which is substantially flat.

5. The system according to claim 1 wherein the hopper comprises at least one side which is substantially flat and comprises a leading edge which extends beyond a leading edge of an opposite side.

6. The system according to claim 4 wherein the end of the hopper for receiving material to be mulched comprises an opening that is wider than an opening formed in the opposite end configured to be connected to an intake of the mulching device.

7. The system according to claim 1 wherein the floor stand comprises at least one securing device for releasably securing a hand-manipulatable blower/vacuum mulching device.

8. The system according to claim 1 wherein the floor stand comprises a securing device pivotably engaged thereto, wherein the securing device is operable to removably engage and permit pivotable selective positioning of a hand-manipulatable blower/vacuum mulching device.

9. The system according to claim 8 further comprising a receptacle support.

10. The system according to claim 1 wherein the floor stand comprises one or more switches electrically connected to an electrical power source or cable operable to turn on and turn off a hand-manipulatable blower/vacuum mulching device.

11. The system according to claim 1 wherein the floor stand comprises an electrical receptacle for receiving a power cable of a hand-manipulatable blower/vacuum mulching device, wherein the receptacle is electrically connected to a power cable for connecting to an electrical supply.

* * * * *